United States Patent
Zhao (10) Patent No.: US 8,270,991 B2
(45) Date of Patent: Sep. 18, 2012

(54) NETWORK AND CELL SELECTION AND RESELECTION FOR LONG-TERM EVOLUTION INTER-RADIO ACCESS NETWORK BASED ON LONG-TERM EVOLUTION MOBILITY DRIVER GROUPING

(75) Inventor: Xiaoming Zhao, Plano, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 1107 days.

(21) Appl. No.: 11/852,111

(22) Filed: Sep. 7, 2007

(65) Prior Publication Data
US 2009/0069016 A1  Mar. 12, 2009

(51) Int. Cl.
*H04W 72/00* (2009.01)

(52) U.S. Cl. ............... 455/452.2; 455/436; 455/437; 455/438; 455/439

(58) Field of Classification Search ........ 455/432.1–453
See application file for complete search history.

(56) References Cited

U.S. PATENT DOCUMENTS

| | | | |
|---|---|---|---|
| 7,333,441 B2 * | 2/2008 | Balletti et al. ............... | 370/252 |
| 2004/0162074 A1 * | 8/2004 | Chen ............................ | 455/437 |
| 2005/0075074 A1 * | 4/2005 | Benson et al. ............. | 455/67.11 |
| 2005/0272425 A1 * | 12/2005 | Amerga et al. .............. | 455/436 |
| 2006/0040700 A1 * | 2/2006 | Roberts et al. .............. | 455/525 |
| 2006/0058034 A1 * | 3/2006 | Vaittinen et al. ............. | 455/450 |
| 2008/0070587 A1 * | 3/2008 | Hirvonen et al. ............. | 455/453 |
| 2008/0102896 A1 * | 5/2008 | Wang et al. ................... | 455/560 |
| 2008/0167003 A1 * | 7/2008 | Wang et al. ................... | 455/411 |
| 2008/0227453 A1 * | 9/2008 | Somasundaram et al. .... | 455/436 |
| 2008/0287129 A1 * | 11/2008 | Somasundaram et al. .... | 455/436 |
| 2008/0311900 A1 * | 12/2008 | Pica et al. ..................... | 455/423 |
| 2009/0036127 A1 * | 2/2009 | Kim ........................... | 455/435.2 |
| 2009/0088160 A1 * | 4/2009 | Pani et al. .................... | 455/436 |
| 2009/0137251 A1 * | 5/2009 | Ji et al. ......................... | 455/437 |
| 2009/0163223 A1 * | 6/2009 | Casey .......................... | 455/453 |
| 2009/0209263 A1 * | 8/2009 | Breuer et al. ................ | 455/450 |
| 2009/0280823 A1 * | 11/2009 | Petrovic et al. .............. | 455/453 |
| 2010/0255849 A1 * | 10/2010 | Ore ............................... | 455/450 |
| 2010/0304747 A1 * | 12/2010 | Kazmi et al. ................ | 455/436 |

FOREIGN PATENT DOCUMENTS

EP  1628497 A1  2/2006

(Continued)

OTHER PUBLICATIONS

EP Search and Examination Report; EP07116607.8; Jan. 2, 2008; 5 pgs.

(Continued)

*Primary Examiner* — Lester Kincaid
*Assistant Examiner* — Mehmood B Khan
(74) *Attorney, Agent, or Firm* — Conley Rose, P.C.; J. Robert Brown, Jr.

(57) ABSTRACT

A system is provided for selecting a cell to which to hand off a user equipment (UE). The system includes a processor programmed to promote evaluation of a plurality of mobility drivers for one or more neighbor cells of a cell serving the UE (user equipment). The processor programmed to promote evaluation of a plurality of groups of mobility drivers based on the evaluations of the mobility drivers, wherein the UE is handed off to one of the cells based on the groups of mobility drivers that are evaluated positively.

15 Claims, 7 Drawing Sheets

| | Source Network/Cell | | | Target Network/Cell | | | | |
|---|---|---|---|---|---|---|---|---|
| Case# | UE Capability & service coverage | Radio Conditions | Load Balancing Conditions | service coverage | Radio Conditions | Load Balancing Conditions | cell reselection | Neighbor cell section used for reselection |
| 1 | no | good | ok | yes | good | ok | yes | C |
| 5 | yes | good | not ok | yes | good | ok | yes | C |
| 6 | yes | bad | ok | yes | good | ok | yes | C |
| 2 | yes | bad | ok | no | good | ok | no | N/A |
| 3 | yes | bad | ok | yes | good | not ok | yes | B |
| 4 | yes | bad | ok | yes | bad | ok | no | N/A |
| 7 | no | good | ok | yes | bad | not ok | FFS | A |

FOREIGN PATENT DOCUMENTS

WO          03/071824 A1      8/2003

OTHER PUBLICATIONS

3GPP TS 36.300 V8.1.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; Release 8; Jun. 2007; 106 pgs.

PCT International Search Report; PCT Application No. PCT/US2008/074329; Jan. 29, 2009; 3 pgs.

PCT Written Opinion of the International Searching Authority; PCT Application No. PCT/US2008/074329; Jan. 29, 2009; 5 pgs.

PCT International Preliminary Report on Patentability dated Dec. 28, 2009; PCT/US2008/074329; 4 pages.

Canadian Office Action; Application No. 2,698,774; Apr. 19, 2012; 2 pages.

* cited by examiner

| Neighbor cell sections | A | B | C |
|---|---|---|---|
| UE Capability & Service Coverage | x | x | x |
| RF Conditions | 0 | x | x |
| Load Balancing/Network sharing | 0 | 0 | x |

FIG. 3

| Case# | Source Network/Cell | | | Target Network/Cell | | | cell reselection | Neighbor cell section used for reselection |
|---|---|---|---|---|---|---|---|---|
| | UE Capability & service coverage | Radio Conditions | Load Balancing Conditions | service coverage | Radio Conditions | Load Balancing Conditions | | |
| 1 | no | good | ok | yes | good | ok | yes | C |
| 5 | yes | good | not ok | yes | good | ok | yes | C |
| 6 | yes | bad | ok | yes | good | ok | yes | C |
| 2 | yes | bad | ok | no | good | ok | no | N/A |
| 3 | yes | bad | ok | yes | good | not ok | yes | B |
| 4 | yes | bad | ok | yes | bad | ok | no | N/A |
| 7 | no | good | ok | yes | bad | not ok | FFS | A |

NETWORK AND CELL SELECTION AND RESELECTION FOR LONG-TERM EVOLUTION INTER-RADIO ACCESS NETWORK BASED ON LONG-TERM EVOLUTION MOBILITY DRIVER GROUPING

BACKGROUND

Easily transportable devices with wireless telecommunications capabilities, such as mobile telephones, personal digital assistants, handheld computers, and similar devices, will be referred to herein as wireless devices. The term "wireless device" may refer to a device and its associated Universal Integrated Circuit Card (UICC) that includes a Subscriber Identity Module (SIM) application, a Universal Subscriber Identity Module (USIM) application, or a Removable User Identity Module (R-UIM) application or may refer to the device itself without such a card. A wireless device might communicate with a second wireless device, some other element in a telecommunications network, an automated computing device such as a server computer, or some other device, any of which can be referred to as a correspondent node.

A communications connection between a wireless device and a correspondent node might promote a voice call, a file transfer, or some other type of data exchange, any of which can be referred to as a call or a session. A wireless device can be considered to be in an active state when a data exchange is in progress on the wireless device. A wireless device can be considered to be in an idle state when the wireless device is turned on but is not actively engaged in a data exchange. Alternatively, the term "call" might refer only to an active data exchange and the term "session" might apply to the state of a wireless device that is either involved an active data exchange or is idle but is powered on and capable of engaging in a data exchange.

As technology has evolved, more advanced equipment has been introduced that can provide services that were not possible previously. This advanced equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment.

In traditional wireless telecommunications systems, transmission equipment in a base station transmits signals throughout a geographical region known as a cell. For LTE equipment, the region in which a wireless device can gain access to a telecommunications network might be referred to by a different name, such as a hot spot. As used herein, the term "cell" will be used to refer to any region in which a wireless device can gain access to a telecommunications network, regardless of whether the wireless device is a traditional cellular device or an LTE device.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a system is provided for selecting a cell to which to hand off a user equipment (UE). The system includes a processor programmed to promote evaluation of a plurality of mobility drivers for one or more neighbor cells of a cell serving the UE (user equipment). The processor programmed to promote evaluation of a plurality of groups of mobility drivers based on the evaluations of the mobility drivers, wherein the UE is handed off to one of the cells based on the groups of mobility drivers that are evaluated positively.

In an alternative embodiment, a method is provided for selecting cells for hand off. The method includes evaluating a plurality of mobility drivers for one or more neighbor cells of a cell serving a UE, and evaluating a plurality of mobility driver groups based on the evaluations of the mobility drivers. The method includes categorizing the neighbor cells into a plurality of categories based on the evaluations of the mobility driver groups. The method includes evaluating the neighboring cells for a maximum number of the groups of mobility drivers that are evaluated positively to determine to hand off the UE to one of the neighboring cells.

Figure 1:
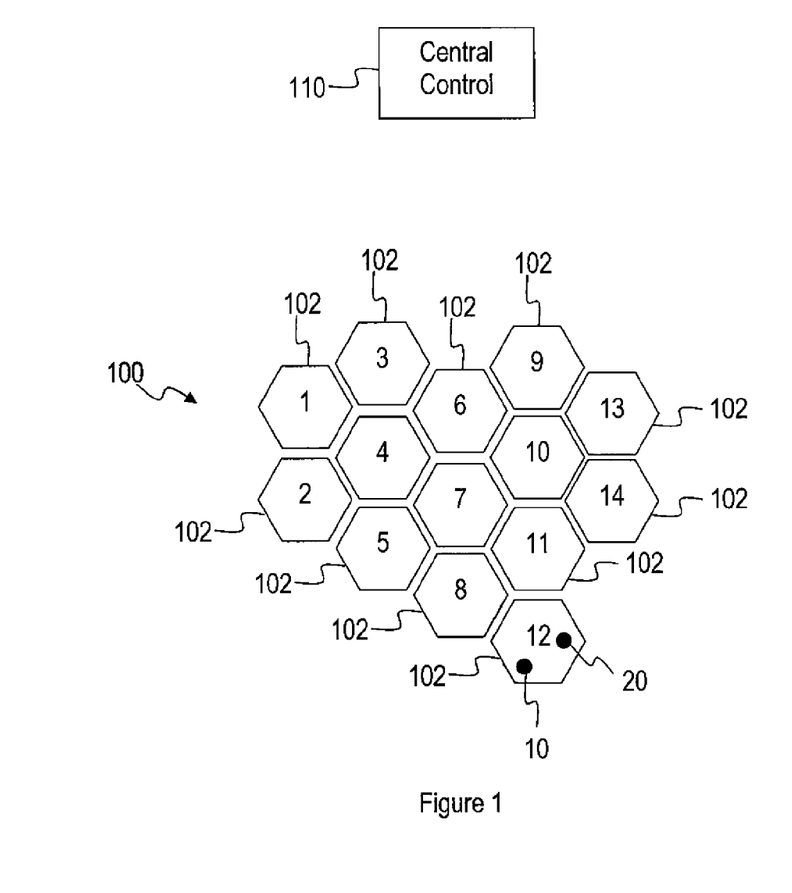
FIG. 1 is an illustration of a cellular network according to an embodiment of the disclosure.

FIG. 1 illustrates an exemplary network 100 according to an embodiment of the disclosure. The network 100 may include a plurality of cells $102_1$, $102_2$, $102_3$, $102_4$, $102_5$, $102_6$, $102_7$, $102_8$, $102_9$, $102_{10}$, $102_{11}$, $102_{12}$, $102_{13}$, and $102_{14}$ (collectively referred to as cells 102). As is apparent to persons of ordinary skill in the art, each of the cells 102 represent a coverage area for providing telecommunications services in the network 100 through communication from a traditional base station, an enhanced node B (ENB), or some other radio link. While the cells 102 are depicted as having non-overlapping coverage areas, persons of ordinary skill in the art will recognize that one or more of the cells 102 may have partially overlapping coverage with adjacent cells. Further, while a particular number of the cells 102 are depicted, persons of ordinary skill in the art will recognize that a larger or smaller number of the cells 102 may be included in the network 100.

One or more wireless devices 10 may be present in each of the cells 102. Although only one wireless device 10 is depicted and is shown in only one cell $102_{12}$, it will be apparent to one of skill in the art that a plurality of wireless devices 10 might be present in each of the cells 102. An ENB, base station, or similar component in each of the cells 102 provides a radio link between the wireless devices 10 and other components in a telecommunications network. Hereinafter, any such component will be referred to as an ENB 20. While the ENB 20 is shown only in cell $102_{12}$, it should be understood that an ENB would be present in each of the cells 102. A central control 110 oversees the wireless data transmissions within the cells 102 by providing centralized management and coordination for the cells 102 and their corresponding ENBs 20. An ENB 20 might have multiple cells 102. The central control 110 may be a mobility management entity (MME). Additional information regarding the e-UTRAN architecture may be found in 3GPP TS 36.304, which is incorporated herein by reference for all purposes.

Figure 2:
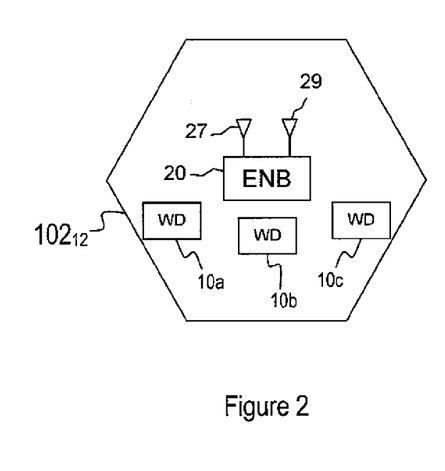
FIG. 2 is an illustration of a cell in a cellular network according to an embodiment of the disclosure.

In the present disclosure, the cellular systems or cells 102 are described as engaged in certain activities, such as transmitting signals; however, as will be readily apparent to one skilled in the art, these activities would in fact be conducted by components comprising the cells. As an example, FIG. 2 depicts a more detailed view of the cell $102_{12}$. The ENB 20 in cell $102_{12}$ can promote communication via a transmitter 27, a receiver 29, and/or other well known equipment. Similar equipment might be present in the other cells 102. A plurality of wireless devices 10 are present in the cell $102_{12}$, as might be the case in the other cells 102.

Various situations may arise that may promote consideration of whether one of the wireless devices 10 should be handed off from one cell 102 to another. For example, the wireless device 10 might move from one cell 102 to another, communication conditions in the cell 102 in which the wireless device 10 is located might become less favorable than the conditions in another cell 102, or a service might be requested that is not available in the current cell 102. A situation in which consideration may be given to handing off one of the wireless devices 10 from one cell 102 to another can be referred to as a mobility action.

Mobility actions might occur for mobile devices 10 that are in either an active state or an idle state. In the idle state, the wireless device 10 is turned on but is not engaged in a call. When the wireless device 10 is powered up, it typically registers with the cell 102 in which it is currently located and can be considered to be camped in that cell 102. If the wireless device 10 moves to a different cell 102, the wireless device 10 might register with and camp in the different cell 102, even if the wireless device 10 remains idle during the move. The wireless device 10 can be considered to be in the active state when a call is in progress on the wireless device 10. In the active state, mobility actions might be caused by the movement of the wireless device 10, by a change in the communication conditions in the cell 102 in which the wireless device 10 is located, or by other events.

The parameters that determine when a mobility action occurs and whether one of the wireless devices 10 is handed off from one cell 102 to another when a mobility action occurs can be referred to as mobility drivers. A set of ten mobility drivers has been defined that includes best radio condition, camp load balancing, traffic load balancing, wireless device capability, hierarchical cell structures, network sharing, private networks/home cells, subscription-based mobility control, service-based mobility control, and MBMS. Details about these mobility drivers can be found in the $3^{rd}$ Generation Partnership Project (3GPP) Technical Specification TS 36.300, which is incorporated herein by reference for all purposes. In other embodiments, other mobility drivers could be defined.

The best radio condition mobility driver refers to the quality of the radio signals between the wireless devices 10 and the ENBs 20. Radio condition parameters might include signal strength, path loss, propagation delay, received reference symbol power, and other signal quality parameters known to one of skill in the art.

The camp load balancing and traffic load balancing mobility drivers refer to the distribution of the wireless devices 10 among the available cells 102. Traffic load balancing can improve call quality for active wireless devices 10, since user throughput decreases as the number of active wireless devices 10 in one of the cells 102 increases. Camp load balancing prevents an excessive number of idle wireless devices 10 from camping in the same cell 102. If a large number of wireless devices 10 were camped in the same cell 102 and became active concurrently, a decrease in throughput for the wireless devices 10 could occur. Camp load balancing ensures that upon activation of one or more idle wireless devices 10, the traffic loading of the cells 102 is balanced.

The wireless device capability mobility driver refers to the capabilities of and services available to the wireless devices 10. Different wireless devices 10 might transmit, receive, and process wireless signals using different technologies or via different networks. Similarly, different technologies or networks may be used by different cells 102. Also, some services that may be available to wireless devices 10 in one cell 102 might not be available in another cell 102. An incompatibility between the capabilities or services of one of the wireless devices 10 and the capabilities or services available in one of the cells 102 can cause a mobility action.

The hierarchical cell structures mobility driver refers to any hierarchy that might exist among the cells 102. For example, to efficiently provide services to multiple cells 102, an umbrella cell might be deployed to cover a large area and might provide capacity to the cells 102 on a frequency different from the frequency that might otherwise be used by the individual cells 102.

The network sharing mobility driver refers to actions that may occur in overlapping regions of two or more cells 102. At the edge of a shared portion of a network, it may be necessary to direct wireless devices 10 belonging to different networks to different target cells 102. Mobility actions may occur in both idle and active states to support differentiation between wireless devices 10 of different operators.

The private networks/home cells mobility driver refers to cells 102 that are part of a sub-network, such as home base stations and similar small-scale cells. Since it is typically undesirable for wireless devices 10 that do not belong to private sub-networks to attempt to camp in or access the private sub-networks, the proximity of a private sub-network can cause a mobility action.

The subscription-based and service-based mobility control mobility drivers refer to the limitation of mobility for wireless devices 10 based on subscription policies or service policies. A telecommunications operator may have different policies in allocating frequencies to the services to which users can subscribe. For example, the operator may concentrate wireless devices 10 requiring higher data rates on a frequency layer or radio access technology (RAT) having a greater bandwidth. The operator may also want to place premium services on a frequency layer or RAT that has better coverage or greater bandwidth. The nature of the service being requested might also be considered in controlling mobility. Such service and/or subscription dependent control, which is typically based on network decisions and not on wireless device decisions, can cause a mobility action.

The MBMS mobility driver refers to services such as broadcasts or multicasts of television programs, streaming video, streaming audio, and other multimedia content. Such services are commonly referred to as multimedia broadcast multicast services (MBMS). As MBMSs may be provided only in certain frequency layers, it may be beneficial to control the mobility of one of the wireless devices 10 based on whether or not the wireless device 10 is currently receiving a MBMS. If the wireless device 10 is receiving an MBMS and moves from its current cell 102, it may be desirable to hand the wireless device 10 off to one of the cells 102 that is capable of providing the MBMS. Therefore, MBMS transmissions may be taken into consideration when mobility actions occur.

In an embodiment, these ten mobility drivers are classified into three groups. The wireless device capability mobility driver, the private networks/home cells mobility driver, the subscription-based mobility control mobility driver, the service-based mobility control mobility driver, and the MBMS mobility driver are classified into a group that can be referred to as group 1 or may also be referred to as UE Capabilities and Service Coverage. The radio conditions mobility driver is classified into a group that can be referred to as group 2 or may also be referred to as RF Conditions. The camp load balancing mobility driver, the traffic load balancing mobility driver, the hierarchical cell structures mobility driver, and the network sharing mobility driver are classified into a group that can be referred to as group 3 or may also be referred to as Load Balancing/Network Sharing. In other embodiments, these mobility drivers could be grouped differently, other mobility drivers could be used, and the mobility drivers could be classified into different numbers of groups.

The cells 102 to which a handoff might occur can be referred to as neighbor cells. The cell 102 currently servicing the wireless device 10 might be referred to as a serving cell. Neighbor cells are not necessarily immediately adjacent to the cell 102 in which one of the wireless devices 10 is currently located, but could be any cells from which the wireless device 10 can receive signals and to which the wireless device 10 can hand off a call. The term handoff or handing off a wireless device or UE (user equipment) might refer to the act or process of transferring service for a UE or wireless device from a serving cell to a neighbor or target cell.

In an embodiment, the mobility drivers for the neighbor cells are evaluated to determine the relevance and/or status of the mobility drivers. A mobility driver can be considered relevant if it applies to a current call. For example, if an MBMS is not being provided on a call, then the MBMS driver could be considered irrelevant to the call. The status of a mobility driver can refer to the availability and/or quality of the service, capability, or condition applicable to the mobility driver. For example, if one of the cells 102 is capable of providing MBMSs, the MBMS mobility driver could be considered true or positive for that cell 102. The wireless device capability mobility driver could be considered true or positive for one of the cells 102 if the cell 102 can support the capabilities of one of the wireless devices 10 that might be handed off to the cell 102. The best radio conditions mobility driver could be considered true or positive for one of the cells 102 if the radio signal in the cell 102 is adequate to support a call that might be handed off to the cell 102. Similar considerations could apply to the other mobility drivers. Hereinafter, any evaluation of true, positive, adequate, available, and the like will be referred to as a true evaluation, and any evaluation of false, negative, inadequate, unavailable, and the like will be referred to as a false evaluation.

When the mobility drivers have been evaluated, the mobility driver groups can then be evaluated based on the evaluations of the mobility drivers in each group. A mobility driver group can be evaluated as true when all of the relevant mobility drivers in the group evaluate as true. If one or more relevant mobility drivers in a group evaluate as false, the group is evaluated as false. Irrelevant mobility drivers are not considered in the evaluation of a group.

When the mobility driver groups have been evaluated, each neighbor cell can be categorized according to the mobility driver groups that are true in that neighbor cell. If only group 1 is true for a neighbor cell, that cell can be placed in a category that can be referred to as category A. If both group 1 and group 2 are true for a neighbor cell, that cell can be placed in a category that can be referred to as category B. If groups 1, 2, and 3 are all true for a neighbor cell, that cell can be placed in a category that can be referred to as category C.

In an embodiment, when a mobility action occurs, a determination is first made whether any of the neighbor cells are category C cells. If one category C neighbor cell is found, a handoff is made to that neighbor cell. If more than one category C neighbor cell is found, a handoff is made to the category C neighbor cell with the best radio conditions. If no category C neighbor cells are found, a determination is made whether any of the neighbor cells are category B cells. If one category B neighbor cell is found, a handoff is made to that neighbor cell. If more than one category B neighbor cell is found, a handoff is made to the category B neighbor cell with the best radio conditions. If no category B neighbor cells are found, a determination is made whether any of the neighbor cells are category A cells. If one or more category A neighbor cells are found, one of the category A neighbor cells can be selected for the handoff based on one or more of the group 1 mobility drivers or on other factors. If no suitable category A neighbor cells are found, no handoff is made.

In other words, a handoff is made to a cell in which the maximum number of groups are evaluated as true. An attempt is made to find a cell in which groups 1, 2, and 3 are all evaluated as true. If such a cell is found, a handoff is made to that cell. If such a cell is not found, an attempt is made to find a cell in which groups 1 and 2 are evaluated as true. If such a cell is found, a handoff is made to that cell. If such a cell is not found, an attempt is made to find a cell in which group 1 is evaluated as true. If such a cell is found, a handoff is made to that cell. If such a cell is not found, no handoff is made.

In one embodiment, some or various of the aspects of the present disclosure may be implemented on a wireless device or UE, a network component such as a base station or ENB, central controller, or elsewhere. In one embodiment the system or network is an LTE inter-radio access technology system with multiple radio access technologies. The target cells to which the UE may be handed over may be intra or inter-radio access technology cells.

Figure 3:
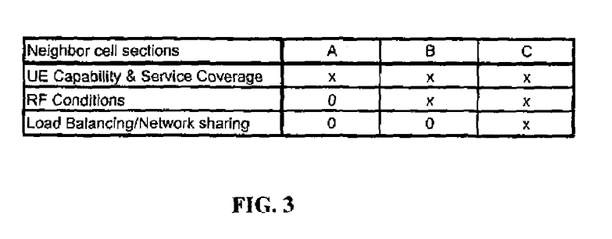
FIG. 3 is table illustrating classification and/or categorization of neighbor cells according on an embodiment of the present disclosure.
Figure 4:
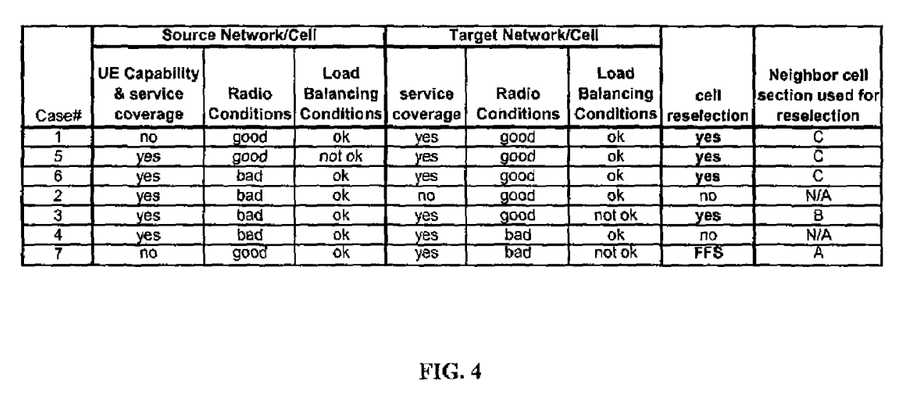
FIG. 4 is a table illustrating neighbor cell selection based on mobility driver grouping according on an embodiment of the present disclosure.

FIG. 3 is a table depicting neighbor cell section classification and/or categorization as described above. Although the present disclosure describes three classifications and/or categorizations for neighbor cells, fewer or more numbers could be used, which is within the spirit and scope of the present disclosure. FIG. 4 is a table illustrating neighbor cell selection based on mobility driver grouping as described above. Although the present disclosure describes three mobility driver grouping under which each of the individual mobility drivers are arranged, fewer or more numbers of groupings could be used, which is also within the spirit and scope of the present disclosure.

Figure 5:
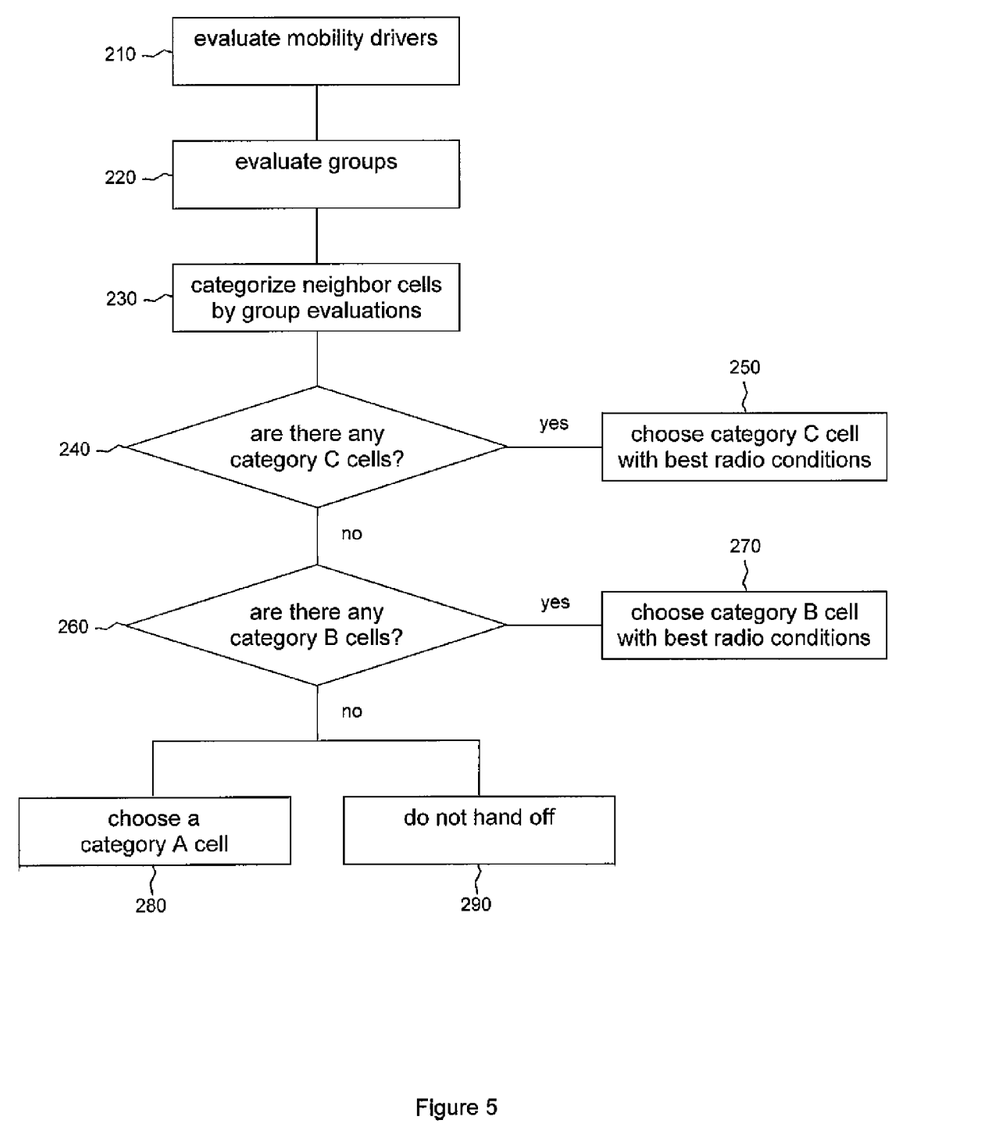
FIG. 5 is a diagram of a method for selecting a cell to receive a handoff according to an embodiment of the disclosure.

FIG. 5 summarizes this neighbor cell selection method. In block 210, an evaluation is performed of the mobility drivers for the neighbor cells of a cell from which a handoff might occur. In block 220, an evaluation is performed of a plurality of groups of mobility drivers based on the evaluations of the mobility drivers. In block 230, the neighbor cells are categorized into A, B, and C categories according to the evaluations of the mobility driver groups. In block 240, a determination is made whether any of the neighbor cells are category C cells. If one or more category C cells are present, the category C cell with the best radio conditions is selected to receive the handoff in block 250. If no category C cells are present, a determination is made in block 260 whether any of the neighbor cells are category B cells. If one or more category B cells are present, the category B cell with the best radio conditions is selected to receive the handoff in block 270. If no category B cells are present, one of two options can be selected. In block 280, if one or more category A cells are present, one of the category A cells might be selected to receive the handoff. In block 290, if no category A cells are present or if a suitable category A cell cannot be found, no handoff is performed.

Figure 6:
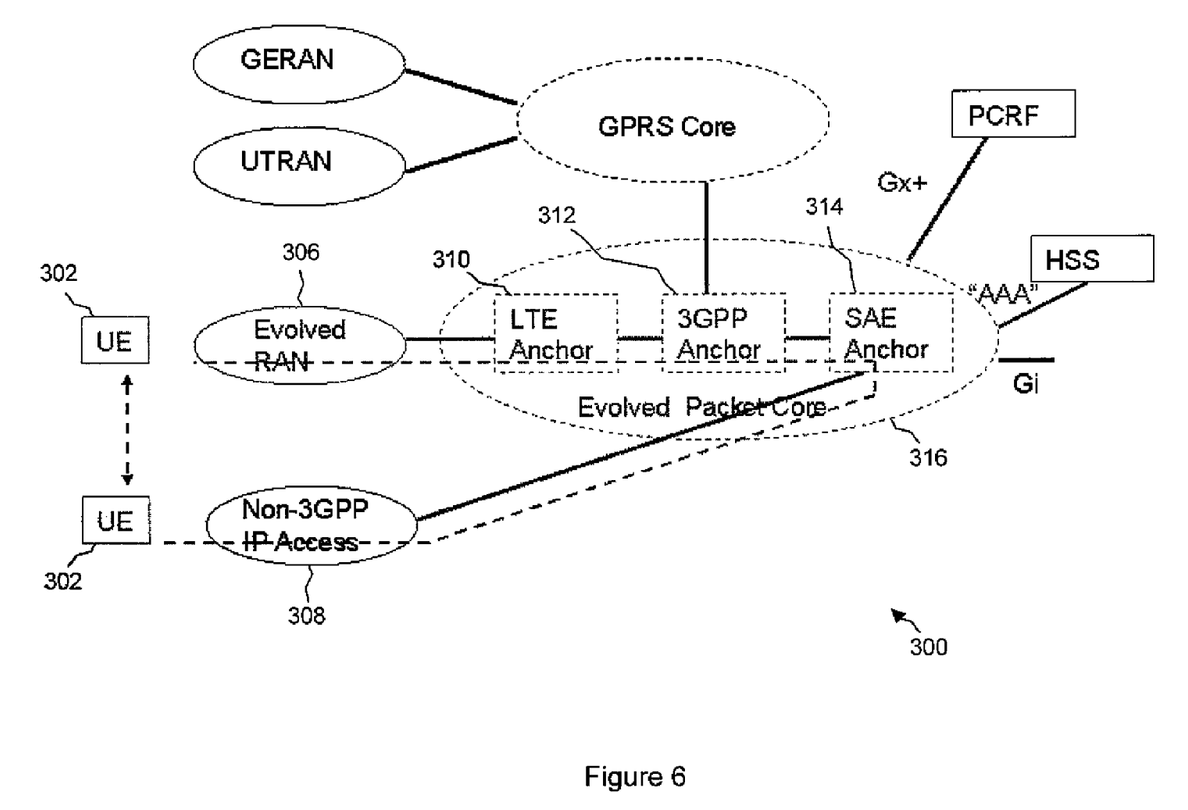
FIG. 6 is a diagram of a network according to an embodiment of the disclosure.

FIG. 6 illustrates a typical telecommunications network 300 in which the neighbor cell selection method might be used. A wireless device, referred to here as user equipment, UE (user equipment) 302, may be a multi-domain device with LTE capabilities. The UE 302 communicates with an evolved radio access network (RAN) 306. The UE 302 may also move between networks, in which case the UE 302 may communicates with a non-3GPP internet protocol (IP) access network 308. Via the evolved RAN 306, the UE 302 can communicate with an LTE anchor 310, which can communicate with a 3GPP anchor 312, which can communicate with a system architecture evolution (SAE) anchor 314. When communicating via the non-3GPP internet protocol (IP) access network 308, the UE 302 can communicate with the SAE anchor 314. The LTE anchor 310, the 3GPP anchor 312, and the SAE anchor 314 comprise an evolved packet core 316.

In an embodiment, the functionality to implement the neighbor cell selection method might be located in a component in the evolved packet core 316. In another embodiment, this functionality might be located in one or more of the ENBs 20 or other components in the cells 102. In yet another embodiment, this functionality might be located in one or more of the wireless devices 10.

Figure 7:
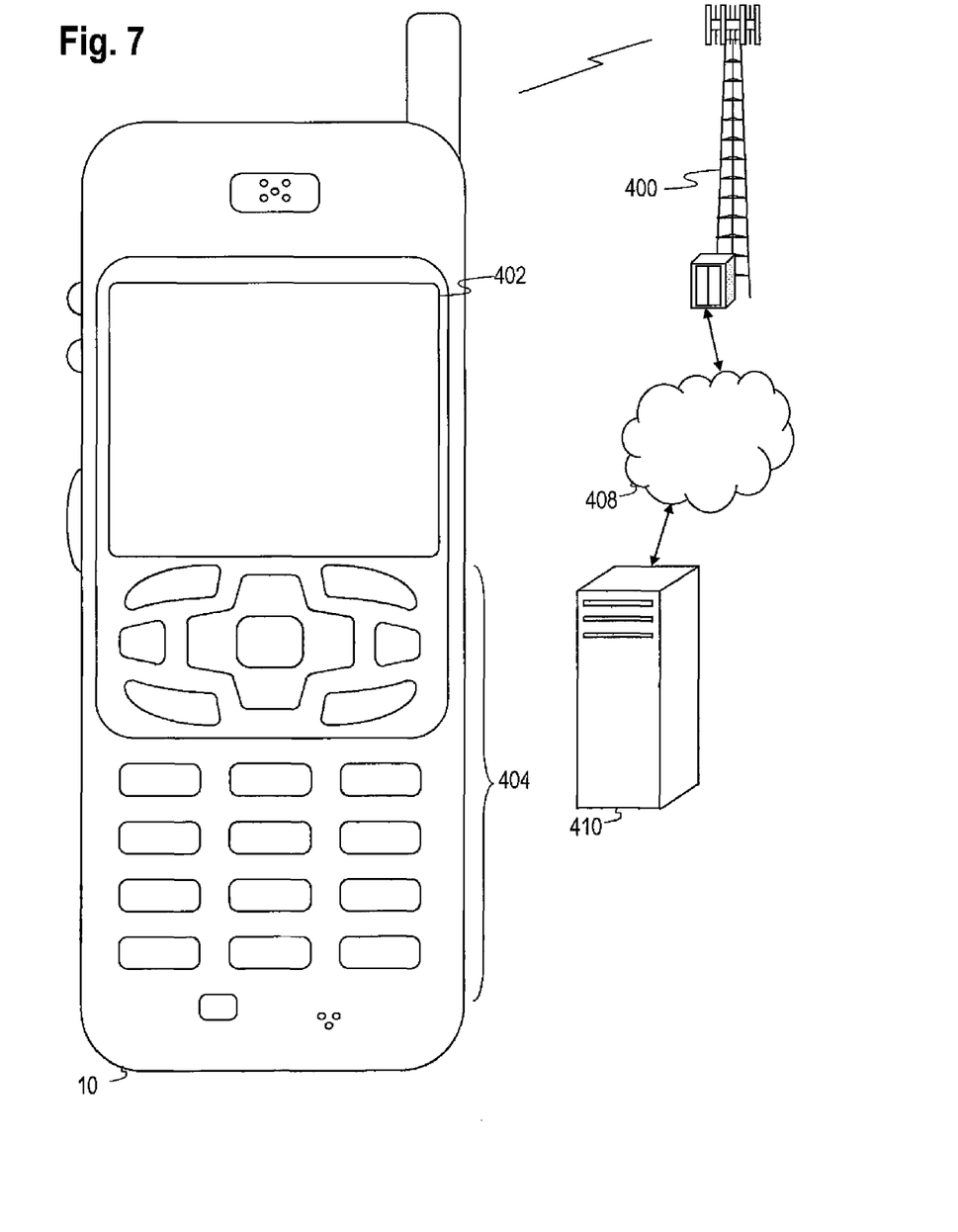
FIG. 7 is a diagram of a wireless communications system including a wireless device operable for some of the various embodiments of the disclosure.

FIG. 7 illustrates a wireless communications system including an embodiment of the wireless device 10. The wireless device 10, which may also be referred to as user equipment (UE), is operable for implementing aspects of the disclosure, but the disclosure should not be limited to these implementations. Though illustrated as a mobile phone, the wireless device 10 may take various forms including a wireless handset, a pager, a personal digital assistant (PDA), a portable computer, a tablet computer, or a laptop computer. Many suitable devices combine some or all of these functions. In some embodiments of the disclosure, the wireless device 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the wireless device 10 may be a portable, laptop or other computing device. The wireless device 10 may support specialized activities such as gaming, inventory control, job control, and/ or task management functions, and so on. The wireless device 10 or UE my be a dual or multi-mode or multi-domain device operable to access various networks and systems including e-UTRAN, and other radio access technologies (RAT) such as GERAN, UTRAN, WiMAX, CDMA 2000, WLAN, and others that will readily suggest themselves to one skilled in the art. The wireless device 10 or UE, in the present embodiment, supports LTE services including multiple mode, single or dual mode radio, multiple packet data network (PDN) connectivity support, IP protocol support such as MIPv4, MIPv6, multiple radio access network (RAN) cell measurement, and so on, such as those specific to LTE UE including after developed functionality.

The wireless device 10 includes a display 402. The wireless device 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The wireless device 10 may present options for the user to select, controls for the user to actuate, and/or cursors or other indicators for the user to direct.

The wireless device 10 may further accept data entry from the user, including numbers to dial or various parameter values for configuring the operation of the wireless device 10. The wireless device 10 may further execute one or more software or firmware applications in response to user commands. These applications may configure the wireless device 10 to perform various customized functions in response to user interaction. Additionally, the wireless device 10 may be programmed and/or configured over-the-air, for example from a wireless base station, a wireless access point, or a peer wireless device 10.

Among the various applications executable by the wireless device 10 are a web browser, which enables the display 402 to show a web page. The web page may be obtained via wireless communications with a wireless network access node, a cell tower, a peer wireless device 10, or any other wireless communication network or system 400. The network 400 is coupled to a wired network 408, such as the Internet. Via the wireless link and the wired network, the wireless device 10 has access to information on various servers, such as a server 410. The server 410 may provide content that may be shown on the display 402. Alternately, the wireless device 10 may access the network 400 through a peer wireless device 10 acting as an intermediary, in a relay type or hop type of connection.

Figure 8:
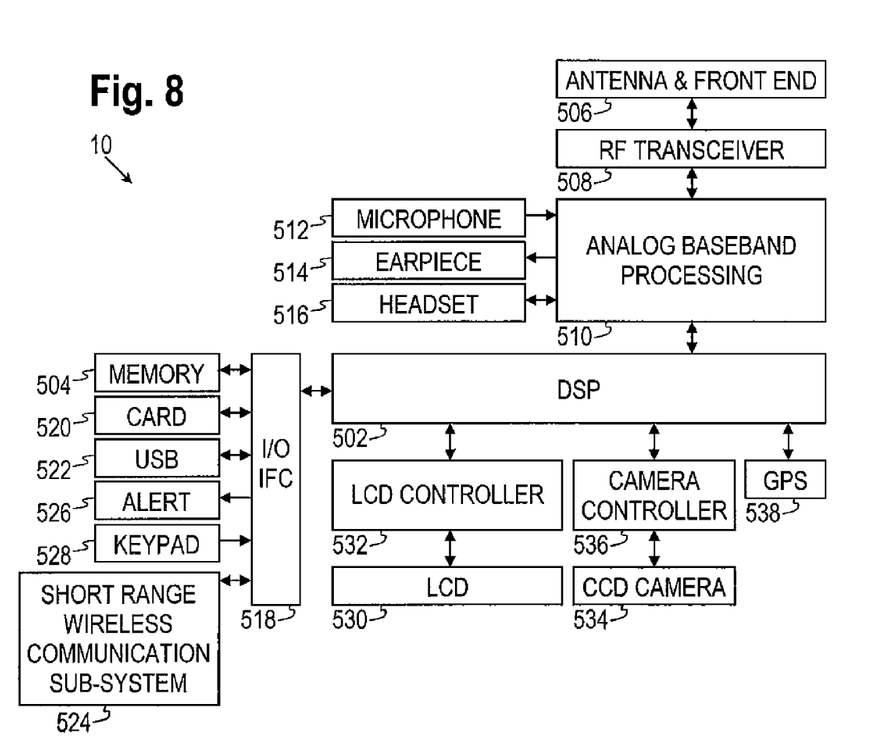
FIG. 8 is a block diagram of a wireless device operable for some of the various embodiments of the disclosure.

FIG. 8 shows a block diagram of the wireless device 10. While a variety of known components of wireless devices 10 are depicted, in an embodiment a subset of the listed components and/or additional components not listed may be included in the wireless device 10. The wireless device 10 includes a digital signal processor (DSP) 502 and a memory 504. As shown, the wireless device 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the wireless device 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the wireless device 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the wireless device 10 to send and receive information from a cellular network or some other available wireless communications network or from a peer wireless device 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the wireless device 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the wireless device 10 and may also enable the wireless device 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the wireless device 10 to communicate wirelessly with other nearby mobile devices and/or wireless base stations.

The input/output interface 518 may further connect the DSP 502 to the alert 526 that, when triggered, causes the wireless device 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the wireless device 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the wireless device 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the wireless device 10 to determine its position. Various other peripherals may also be included to provide additional functions, e.g., radio and television reception.

Figure 9:
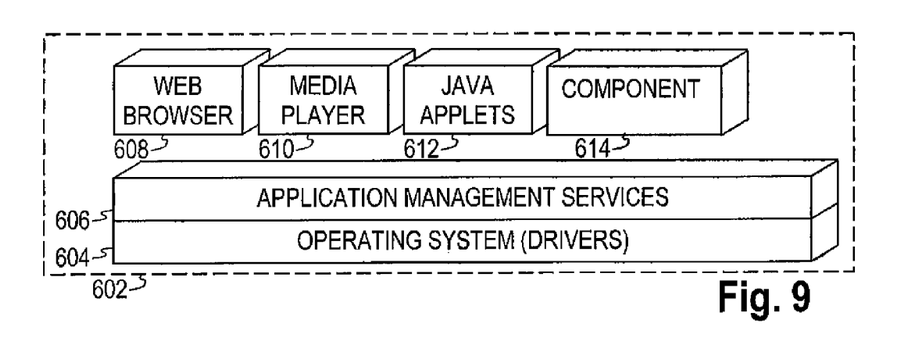
FIG. 9 is a diagram of a software environment that may be implemented on a wireless device operable for some of the various embodiments of the disclosure.

FIG. 9 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the wireless device 10. Also shown in FIG. 9 are a web browser application 608, a media player application 610, and Java applets 612. The web browser application 608 configures the wireless device 10 to operate as a web browser, allowing a user to enter information into forms and select links to retrieve and view web pages. The media player application 610 configures the wireless device 10 to retrieve and play audio or audiovisual media. The Java applets 612 configure the wireless device 10 to provide games, utilities, and other functionality. A component 614 might provide functionality related to cell selection.

Figure 10:
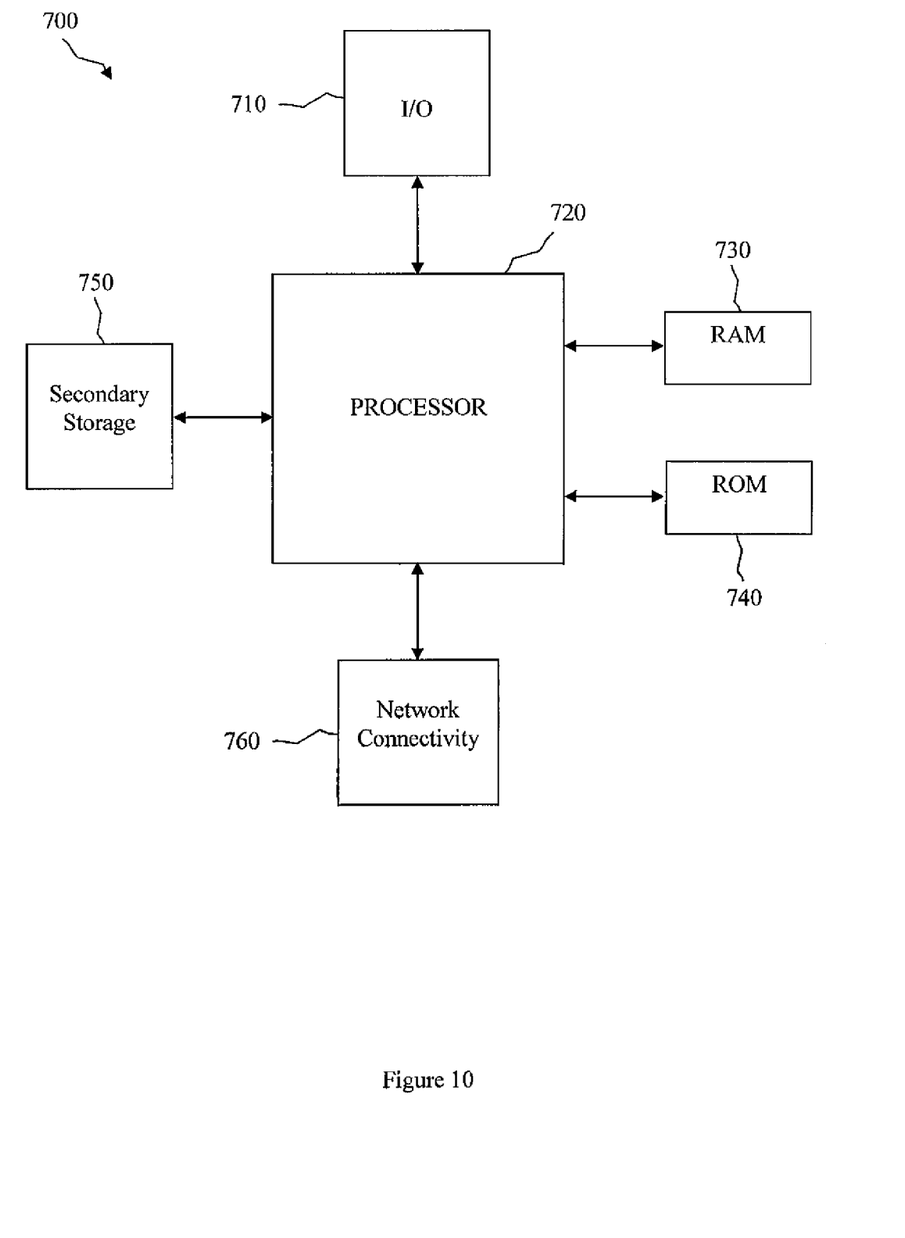
FIG. 10 is an illustrative general purpose computer system suitable for some of the various embodiments of the disclosure.

The ENB 20, the central control 110, and other components that might be associated with the cells 102 may include any general-purpose computer with sufficient processing power, memory resources, and network throughput capability to handle the necessary workload placed upon it. FIG. 10 illustrates a typical, general-purpose computer system 700 that may be suitable for implementing one or more embodiments disclosed herein. The computer system 700 includes a processor 720 (which may be referred to as a central processor unit or CPU) that is in communication with memory devices including secondary storage 750, read only memory (ROM) 740, random access memory (RAM) 730, input/output (I/O) devices 710, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 760 devices may enable the processor 720 to communicate with an Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity 760 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk based systems may all be considered secondary storage 750), ROM 740, RAM 730, or the network connectivity devices 760.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for selecting a cell to which to hand off, comprising:
   a processor programmed to promote evaluation of a plurality of mobility drivers within each of a plurality of mobility driver groups for one or more neighbor cells of a cell serving a UE (user equipment), the processor programmed to promote evaluation of a plurality of groups of mobility drivers based on the evaluations of the mobility drivers to determine which of the plurality of mobility driver groups is capable of supporting the hand off; and the processor programmed to promote categorization of the one or more neighbor cells into a plurality of categories according to the evaluations of the mobility driver groups and to determine which of the plurality of categories has the most number of mobility driver groups capable of supporting the hand off, wherein, when more than one neighbor cell is found in the one of the plurality of categories determined to have the most number of the mobility driver groups capable of supporting the hand off, handing the UE off to one of the more than one neighbor cell that has a best radio condition.

2. The system of claim 1, wherein the mobility drivers are best radio condition, camp load balancing, traffic load balancing, wireless device capability, hierarchical cell structures, network sharing, private networks/home cells, subscription-based mobility control, service-based mobility control, and MBMS.

3. The system of claim 2, wherein the wireless device capability, private networks/home cells, subscription-based mobility control, service-based mobility control, and MBMS mobility drivers are placed in a first group, the mobility driver of best radio condition is placed in a second group, and the camp load balancing, traffic load balancing, hierarchical cell structures, and network sharing mobility drivers are placed in a third group.

4. The system of claim 3, wherein each of the first group, the second group, and the third group is determined to be capable of supporting the hand off when each relevant mobility driver in the group capable of supporting the hand off.

5. The system of claim 4, wherein one of the plurality of neighbor cells is placed in a first category when the first group, the second group, and the third group of the mobility drivers are capable of supporting the hand off, is placed in a second category when the first group and the second group of the mobility drivers are capable of supporting the hand off, and is placed in a third category when only the first group of the mobility drivers capable of supporting the hand off.

6. The system of claim 5, wherein, when one of the neighbor cells in the first category is found, the UE is handed off to the one of the neighbor cells in the first category, when one of the neighbor cells in the first category is not found but one of the neighbor cells in the second category is found the UE is handed off to the one of the neighbor cells in the second category, when one of the neighbor cells is not found in either of the first category and the second category but one of the neighbor cells in the third category is found the UE is handed off to the one of the neighbor cells in the third category, and when one of the neighbor cells is not found in either of the first, second, and third categories the UE is not handed off.

7. The system of claim 1, wherein the system is a wireless device in a LTE (long term evolution) inter-radio access technology (RAT) system including multiple radio access technologies (RAT).

8. The system of claim 1, wherein the system is a network component in a LTE (long term evolution) inter-radio access technology (RAT) system including multiple radio access technologies (RAT).

9. The system of claim 8, wherein the system is one of a group of network components selected from a group consisting of a base station and an enhanced node B (ENB), and a central control in a LTE (long term evolution) inter-radio access technology (RAT) system including multiple radio access technologies (RAT), and wherein the neighbor cells are intra/intra radio access technology network cells.

10. A method for selecting cells for hand off, comprising:
evaluating by a processor a plurality of mobility drivers within each of a plurality of mobility driver groups for one or more neighbor cells of a cell serving a UE;
evaluating the plurality of mobility driver groups based on the evaluations of the mobility drivers to determine which of the plurality of mobility driver groups is capable of supporting the hand off;
categorizing the one or more neighbor cells into a plurality of categories based on the evaluations of the mobility driver groups;
determining which of the plurality of categories has the most number of mobility driver groups capable of supporting the hand off;
wherein, when more than one neighbor cell is found in the one of the plurality of categories determined to have the most number of the mobility driver groups capable of supporting the hand off, handing the UE off to one of the more than one neighbor cell that has a best radio condition.

11. The method of claim 10, wherein the mobility drivers are best radio condition, camp load balancing, traffic load balancing, wireless device capability, hierarchical cell structures, network sharing, private networks/home cells, subscription-based mobility control, service-based mobility control, and MBMS (Multimedia Broadcast Multicast Service).

12. The method of claim 11, further comprising placing the wireless device capability, private networks/home cells, subscription-based mobility control, service-based mobility control, and MBMS mobility drivers in a first group, the mobility driver of best radio condition in a second group, and the camp load balancing, traffic load balancing, hierarchical cell structures, and network sharing mobility drivers in a third group.

13. The method of claim 12, further comprising evaluating each of the first group, the second group, and the third group positively when each relevant mobility driver in the group is capable of supporting the hand off.

14. The method of claim 13, further comprising placing one of the neighbor cells in a first category when the first group, the second group, and the third group of the mobility drivers are capable of supporting the hand off, in a second category when the first group and the second group of the mobility drivers are capable of supporting the hand off, and in a third category when only the first group of the mobility drivers is capable of supporting the hand off.

15. The method of claim 14, further comprising, when one of the neighbor cells in the first category is found, handing the UE off to the one of the neighbor cells in the first category, when one of the neighbor cells in the first category is not found but one of the neighbor cells in the second category is found, handing the UE off to the one of the neighbor cells in the second category, when one of the neighbor cells is not found in either of the first category and the second category but one of the neighbor cells in the third category is found, handing the UE off to the one of the neighbor cells in the third category, and when one of the neighbor cells is not found in either of the first, second, and third categories, not handing the UE off.

* * * * *